UNITED STATES PATENT OFFICE.

ALBERT PARSONS SACHS AND OSCAR BYRON, OF CARNEGIE, PENNSYLVANIA.

PROCESS OF MANUFACTURING SODIUM SALTS OF SULFONIC ACIDS.

1,207,798.  Specification of Letters Patent. Patented Dec. 12, 1916.

No Drawing.  Application filed April 6, 1916. Serial No. 89,452.

*To all whom it may concern:*

Be it known that we, ALBERT PARSONS SACHS and OSCAR BYRON, citizens of the United States, and residents of Carnegie, Pennsylvania, have invented a new and useful Improvement in Processes of Manufacturing Sodium Salts of Sulfonic Acids, of which the following is a full, clear, and exact description.

The object of our invention is to so modify the known processes of manufacturing sodium benzenesulfonate or other sodium salts of sulfonic acids from a mixture of sulfuric acid and benzenesulfonic acid or other sulfonic acid or acids, as to secure the following advantages: (1) simplification of the process; and (2) economy in the practice of the process by utilizing as a precipitant an otherwise waste product and by eliminating the use of a substance necessary in the process hitherto usually practised.

We shall first describe a preferred way of carrying out the process as applied to the manufacture of sodium benzenesulfonate and shall then point out more particularly its advantages over the process hitherto most generally used.

A mixture of benzenesulfonic acid, sulfuric acid and water is neutralized with lime as usual, so that a total volume of 1700 gallons contains about 5500 pounds of calcium sulfate (as $CaSO_4$) and about 3750 pounds of calcium benzenesulfonate. To this is added, without previous filtration, 600 gallons of a solution (at 35° C.) containing about 2.8 pounds per gallon (or a total of about 1680 pounds) of sodium sulfate, or sodium sulfite, or sodium sulfate and sodium sulfite. After agitation and filtration, the filtrate is evaporated to dryness, the resultant product showing on analysis (on dry basis) about 95 per cent. sodium benzenesulfonate, about 5 per cent. sodium sulfate and sodium sulfite, and a faint trace of calcium salts. The sodium sulfate and sodium sulfite added, as above described, after the step of neutralizing with lime, may be a by-product in the subsequent treatment of the benzenesulfonate or other sodium salt or salts of the sulfonic acid or acids. Thus, as is known, the sodium benzenesulfonate or sodium benzenedisulfonate is fused with caustic soda to produce phenol or resorcinol or mixtures thereof, the melt decomposed with sulfuric acid, and the phenol or resorcinol or the mixtures thereof extracted, leaving as a by-product the said solution of sodium sulfate and sodium sulfite.

The above process may be applied to the treatment of any mixture of sulfuric acid and any sulfonic acid forming a water-soluble calcium salt.

The process above described presents distinct advantages over the usual process, which, as is well known, consists in neutralizing with lime the mixture of sulfuric acid and sulfonic acid or acids, filtering off the calcium sulfate, and subsequently converting the soluble calcium salt of the sulfonic acid or acids by treatment with sodium carbonate. In the first place, filtration is avoided, thereby substantially simplifying the process. The omission, or rather the avoidance, of the filtering step is one of the important features of our invention, it being understood that the invention resides not merely in omitting this step, but in so modifying the process as to render this step unnecessary. In the second place, the precipitant used—sodium sulfate or sodium sulfite, or both—is a by-product in the production of phenol or resorcinol or the mixtures thereof, as above described, which by-product ordinarily goes to waste. The precipitant that we employ is therefore obtained free of cost. Finally, the use of sodium carbonate is avoided.

It will be understood that where in the claims we speak of sodium sulfate, we mean to cover also sodium sulfite or both sodium sulfate and sodium sulfite.

Having now fully described our invention, what we claim and desire to protect by Letters Patent is:

1. The manufacture of a sodium salt of a sulfonic acid from a mixture of a sulfonic acid forming a water soluble calcium salt, sulfuric acid and water, which consists in neutralizing the mixture by the addition thereto of lime, thereby producing a mixture of calcium sulfate and the calcium salt of the sulfonic acid, and then adding thereto sodium sulfate.

2. The manufacture of a sodium salt of a sulfonic acid from a mixture of a sulfonic acid forming a water soluble calcium salt, sulfuric acid and water, which consists in neutralizing the mixture by the addition thereto of lime, thereby producing a mixture of calcium sulfate and the calcium salt of the sulfonic acid, then adding sodium sulfate, and then agitating and filtering.

3. The manufacture of a sodium salt of a sulfonic acid from a mixture of a sulfonic acid forming a water soluble calcium salt, sulfuric acid and water, which consists in neutralizing the mixture by the addition thereto of lime, thereby producing a mixture of calcium sulfate and the calcium salt of the sulfonic acid, and then, without previous filtration, adding to the mixture sodium sulfate.

4. The manufacture of a sodium salt of a sulfonic acid from a mixture of a sulfonic acid forming a water soluble calcium salt, sulfuric acid and water, which consists in neutralizing the mixture by the addition thereto of lime, thereby producing a mixture of calcium sulfate and the calcium salt of the sulfonic acid, then adding sodium sulfate, and filtering only after the addition of the sodium sulfate.

5. The manufacture of sodium benzenesulfonate from a mixture of benzenesulfonic acid, sulfuric acid and water, which consists in neutralizing the mixture by the addition of lime, thereby producing a mixture of calcium sulfate and calcium benzenesulfonate, and then adding to the mixture sodium sulfate.

6. The manufacture of benzenesulfonate from a mixture of benzenesulfonic acid, sulfuric acid and water, which consists in neutralizing the mixture by the addition of lime, thereby producing a mixture of calcium sulfate and calcium benzenesulfonate, and then, without previous filtration, adding to the mixture sodium sulfate.

In testimony of which invention we have hereunto set our hands at Carnegie, Pa., on the 4th day of March, 1916.

ALBERT PARSONS SACHS.
OSCAR BYRON.